United States Patent
Xiao et al.

(10) Patent No.: US 9,594,217 B2
(45) Date of Patent: Mar. 14, 2017

(54) FIBER OPTIC SPLICING ASSEMBLY

(71) Applicants: ADC Telecommunications (Shanghai) Distribution Co., Ltd., Shanghai (CN); ADC Communications (Australia) Pty Limited, Berkeley Vale (AU)

(72) Inventors: Teller Xiao, Shanghai (CN); Yanhong Yang, Shanghai (CN); Liming Wang, Shanghai (CN); Paul Hubbard, Castle Hill (AU)

(73) Assignees: ADC Telecommunications (Shanghai) Distribution Co., Ltd. (CN); ADC Communications (Australia) Pty. Limited (AU)

( * ) Notice: Subject to any disclaimer, the term of this patent is extended or adjusted under 35 U.S.C. 154(b) by 0 days.

(21) Appl. No.: 14/616,198

(22) Filed: Feb. 6, 2015

(65) Prior Publication Data
US 2015/0153513 A1    Jun. 4, 2015

Related U.S. Application Data

(63) Continuation of application No. PCT/IB2013/056339, filed on Aug. 2, 2013.

(30) Foreign Application Priority Data

Aug. 7, 2012 (CN) .......................... 2012 1 0280488

(51) Int. Cl.
*G02B 6/255* (2006.01)
*G02B 6/38* (2006.01)
*G02B 6/44* (2006.01)

(52) U.S. Cl.
CPC ......... *G02B 6/3803* (2013.01); *G02B 6/4441* (2013.01); *G02B 6/4457* (2013.01); *G02B 6/4466* (2013.01)

(58) Field of Classification Search
CPC .. G02B 6/3803; G02B 6/4441; G02B 6/4457; G02B 6/4466
(Continued)

(56) References Cited

U.S. PATENT DOCUMENTS 7,748,660 B2   7/2010  Hendrickson et al.
8,265,447 B2   9/2012  Loeffelholz et al.
(Continued)

FOREIGN PATENT DOCUMENTS

CN   202583564 U   12/2012
CN   202837598 U    3/2013
JP   202583564 U   12/2012

OTHER PUBLICATIONS

PCT International Preliminary Report on Patentability and Written Opinion of the International Searching Authority, International Application No. PCT/IB2013/056339, dated Feb. 10, 2015, 8 pages.
(Continued)

*Primary Examiner* — Jerry Blevins
(74) *Attorney, Agent, or Firm* — Merchant & Gould P.C.

(57) ABSTRACT

A fiber optic splicing assembly is disclosed having an assembly housing and a fiber storing device. The assembly housing has a mounting side and an opposite outer facing side. The fiber storing device is removably mounted to the assembly housing, and is at least partially received in an assembly receiving passageway of a mounting wall.

33 Claims, 13 Drawing Sheets

(58) Field of Classification Search
USPC .......................................................... 385/97
See application file for complete search history.

(56) References Cited

U.S. PATENT DOCUMENTS

2008/0011514 A1     1/2008  Zheng et al.
2010/0074587 A1*    3/2010  Loeffelholz .......... G02B 6/4457
                                                385/135

OTHER PUBLICATIONS

Espacenet Bibliographic Data for CN 202583564U, Dated Dec. 5, 2012, 1 page.
PCT Search Report and Written Opinion issued in co-pending International application PCT/IB2013/056339, 11 pages, dated Nov. 28, 2013.
Search Report of Patent, Application No. 2012102804889, dated Feb. 3, 2015, 3pages.

* cited by examiner

FIBER OPTIC SPLICING ASSEMBLY

CROSS-REFERENCE TO RELATED APPLICATION

This application is a continuation of PCT International Application No. PCT/IB2013/056339 filed Aug. 2, 2013, which claims priority under 35 U.S.C. §119 to Chinese Patent Application No. 201210280488.9, dated Aug. 7, 2012.

FIELD OF THE INVENTION

The invention is generally related to a fiber optic splicing assembly, and more specifically, relates to a fiber optic splicing assembly having a reel and being mountable to a mounting wall.

BACKGROUND

In an optical communication network, fibers from an external optical cable are coupled to respective individual user fibers by splicing. Collectively, these fibers constitute the optical communication network. To splice different fibers together, a fiber optic device is widely applied in the optical communication network, being able to splice fibers in various mounting conditions, such as in air, in pipes and conduits, or in underground environmental conditions.

Conventional fiber optic splicing housing generally include a fiber storing space and a plurality of splicing device receiving spaces positioned on a tray. The fiber storing space is used to store excess and redundant fiber, and the plurality of splicing device receiving spaces are used to mount fiber splicing device s, such as mechanical splicing devices, fusion splicing devices, etc., for coupling different fibers.

However, the fiber storing device of the conventional fiber optic splicing enclosure is not adapted to store an optical cable having a diameter larger than that of the fiber. Thereby, a predetermined length of redundant optical cable must be reserved outside the splicing enclosure according to an arrangement of the splicing enclosure and a support panel for supporting the splicing enclosure. The convention design has several drawbacks. If the reserved redundant optical cable is too short, it may have a disadvantageous effect on the splicing of fibers. If the reserved redundant optical cable is too long, it may be hard to maintain and manage the optical cable and its fiber.

Attempts to address such disadvantages include the use of an external reel for pre-storing the optical cable. However, such external reels are bulky and cannot be embedded in the convention fiber optic splicing housing, and as such are mounted on the mounting wall. Accordingly, the reel is exposed outside the mounting wall and occupies a large volume, having a negative influence on the appearance of the housing, as well as being exposed to external environmental factors.

SUMMARY

A fiber optic splicing assembly has an assembly housing and a fiber storing device. The assembly housing has a mounting side and an opposite outer facing side. The fiber storing device is removably mounted to the assembly housing, and is at least partially received in an assembly receiving passageway of a mounting wall.

BRIEF DESCRIPTION OF THE DRAWINGS

The invention will now be described by way of example, with reference to the accompanying Figures, of which.

DETAILED DESCRIPTION OF THE PREFERRED EMBODIMENTS

Figure 1:
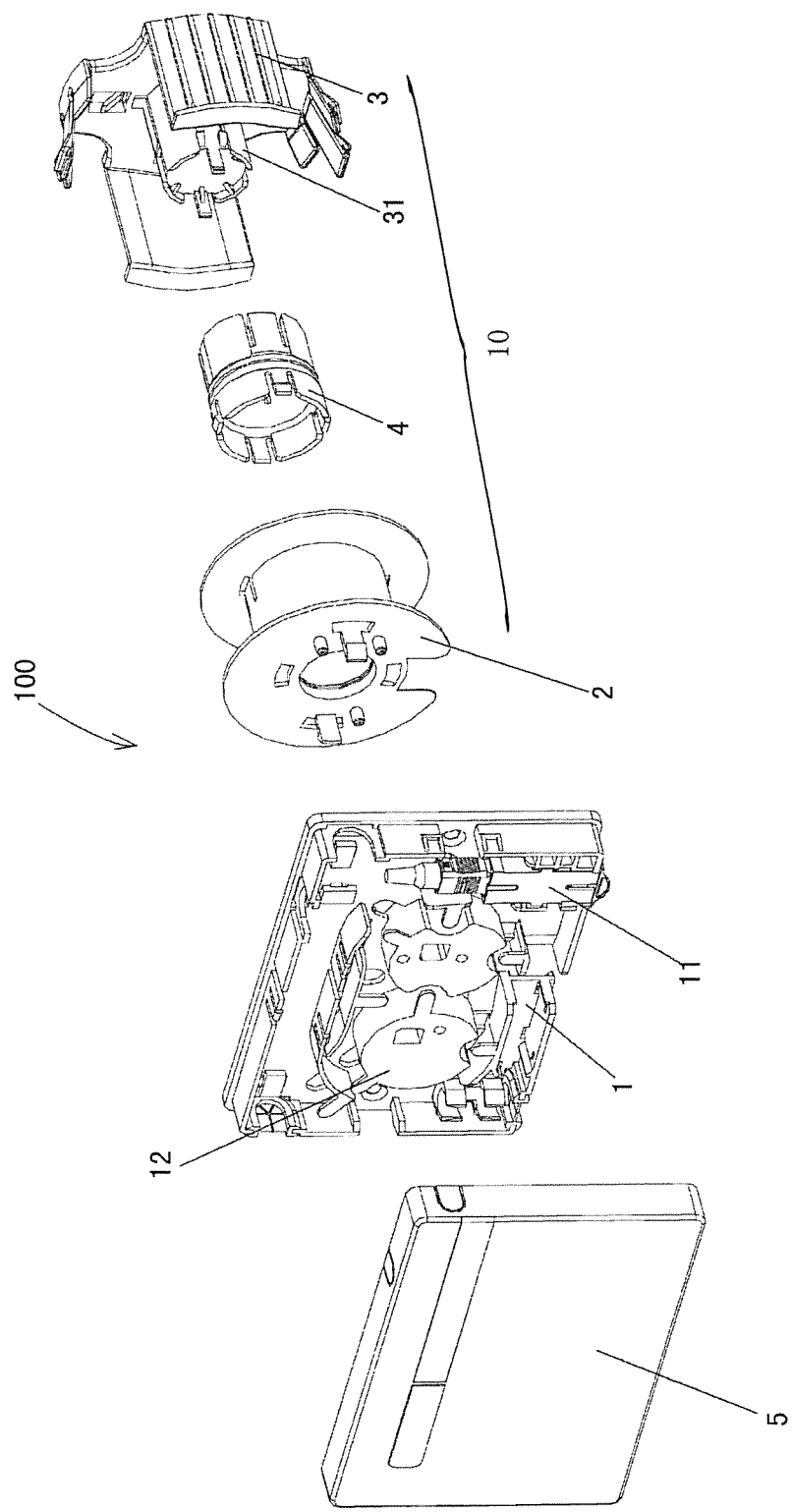
FIG. 1 is an exploded view of a fiber optic splicing assembly.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those of ordinary skill in the art.

Figure 6:
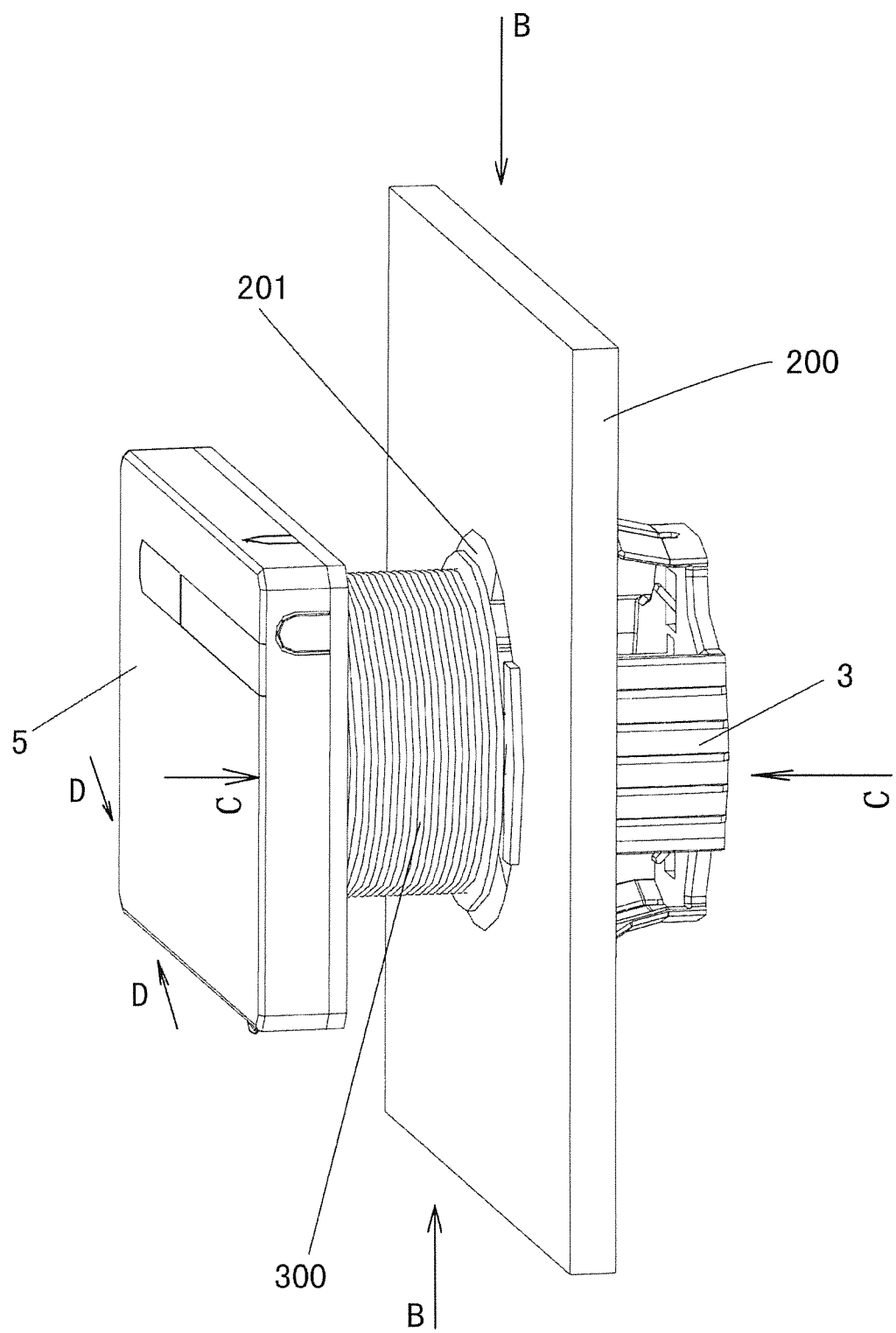
FIG. 6 is a side view of the fiber optic splicing assembly of FIG. 1, wherein the fiber optic splicing assembly is mounted to a mounting wall, and the reel is in an expansion state.

In an embodiment of FIG. 1, a fiber optic splicing assembly 100 is connected to a mounting wall 200 having an assembly receiving passageway 201 (see FIG. 6) extending therethrough. The fiber optic splicing assembly 100 has an assembly housing 1 and a fiber storing device 10. The fiber optic splicing assembly 100 may be applied to splice fibers of different optical cables.

Figure 5:
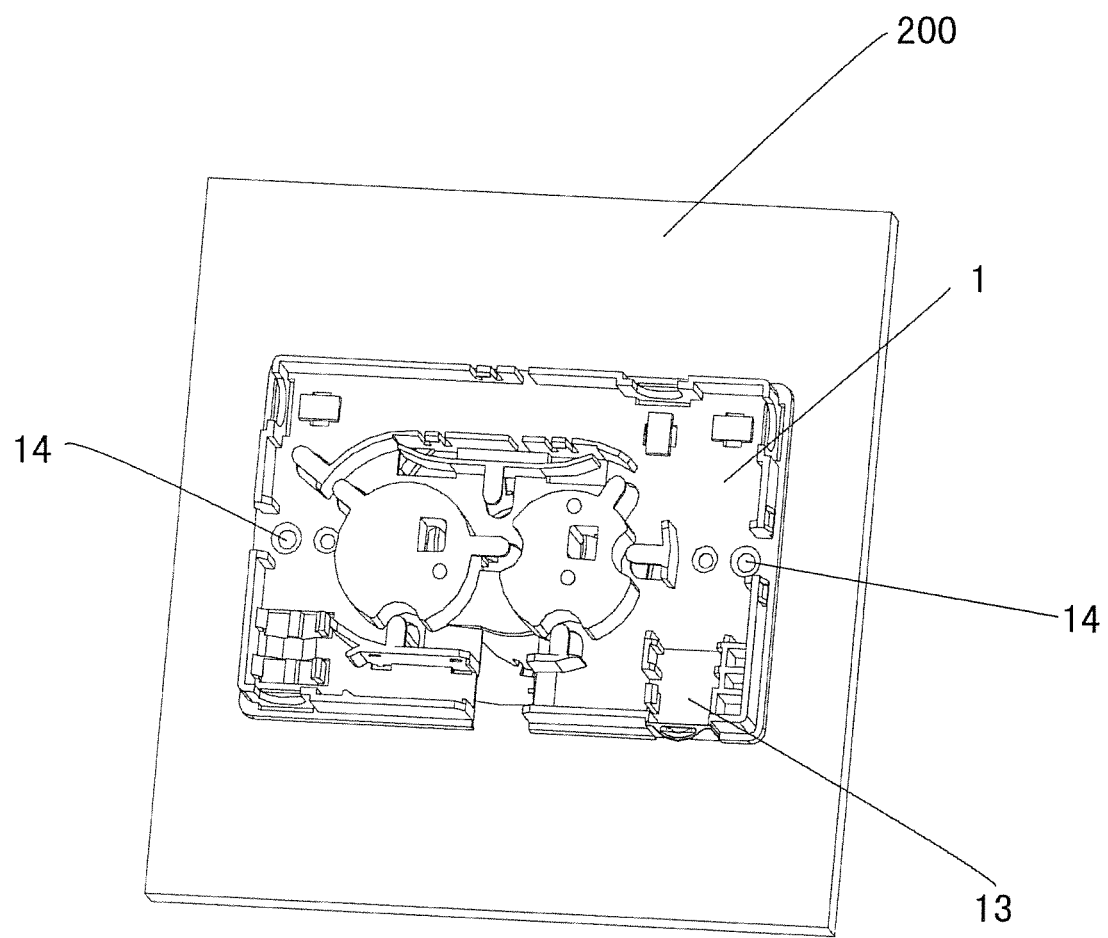
FIG. 5 is a perspective front view of the fiber optic splicing assembly of FIG. 4 when a cover is removed.

In the embodiments of FIGS. 1 and 5, the assembly housing 1 may be constructed as a conventional assembly housing, having a fiber splicing device 11 for optically coupling fibers, a mounting assembly for mounting the fiber splicing device 11, and a storing device 12 for storing redundant fiber. Optionally, the fiber optic splicing assembly 100 includes a complementary cover 5 that is positioned over the assembly housing 1.

In the embodiments of FIGS. 1-7, a fiber optic splicing assembly 100 includes a mounting side of the assembly housing 1 removably connected to a housing side of the mounting wall 200, and an opposite outer facing side of the assembly housing 1 configured to connect to the fiber splicing device 11. The fiber storing device 10 is at least partially received in the assembly receiving passageway 201, and a mounting end of the fiber storing device 10 is removably mounted to the assembly housing 1.

In an embodiment, the fiber storing device 10 has a reel 2. The reel 2 is removably mounted to the mounting side of the assembly housing 1. An optical cable and/or fiber to be spliced is pre-stored on the reel 2, for example, by winding. The fiber storing device 10 further includes a mounting bracket 3 onto which the reel 2 is mounted. The mounting bracket 3 attaches the fiber storing device 10 to the mounting wall 200, for example, on a bracket side, opposite the housing side, of the mounting wall 200.

The mounting bracket 3 has a support shaft 31 with a free end, and the reel 2 is movably mounted onto the support shaft 31 such that the reel 2 can be axially displaced relative to the support shaft 31 from a retraction state to an expansion state. The retraction state is where the reel 2 is positioned in the assembly receiving passageway 201. The expansion state is where the reel 2 is positioned outside the assembly receiving passageway 201. When the reel 2 is in the expansion state, an operator can unspool the optical cable or fiber stored on the reel 2 at a position away from the mounting wall 200. Furthermore, the reel 2 is rotatably mounted onto the support shaft 31 and is received in a reel receiving space (not labeled) of the mounting bracket 3 when mounted on the support shaft 31.

The fiber storing device 10 includes a mounting sleeve 4 having a first end movably connected to the reel 2 in an axial direction, that is, a direction in which the reel 2 is mounted to the support shaft 31, and an opposite second end movably connected to the support shaft 31 in the axial direction. By displacing the mounting sleeve 4 in the axial direction along the support shaft 31, the operator may pull the reel 2 to a position outside the mounting wall 200 where a redundant optical cable or fiber can be easily reeled on or unreeled from the reel 2. In an embodiment, the reel 2 may displaced through the assembly receiving passageway 201 (see FIG. 6) from the bracket side to the housing side of the mounting wall 200, along the support shaft 31, so as to reach the expansion state. The mounting sleeve 4 is movably connected to the support shaft 31, being axially movable, and the first end (a left end shown in FIG. 1, or an upper end shown in FIG. 13) of the mounting sleeve 4 is rotatably connected to the reel 2.

A shape of the mounting sleeve 4 is complimentary to a shape of the support shaft 31. As such, the mounting sleeve 4 is prevented from rotating relative to the support shaft 31.

Figure 12:
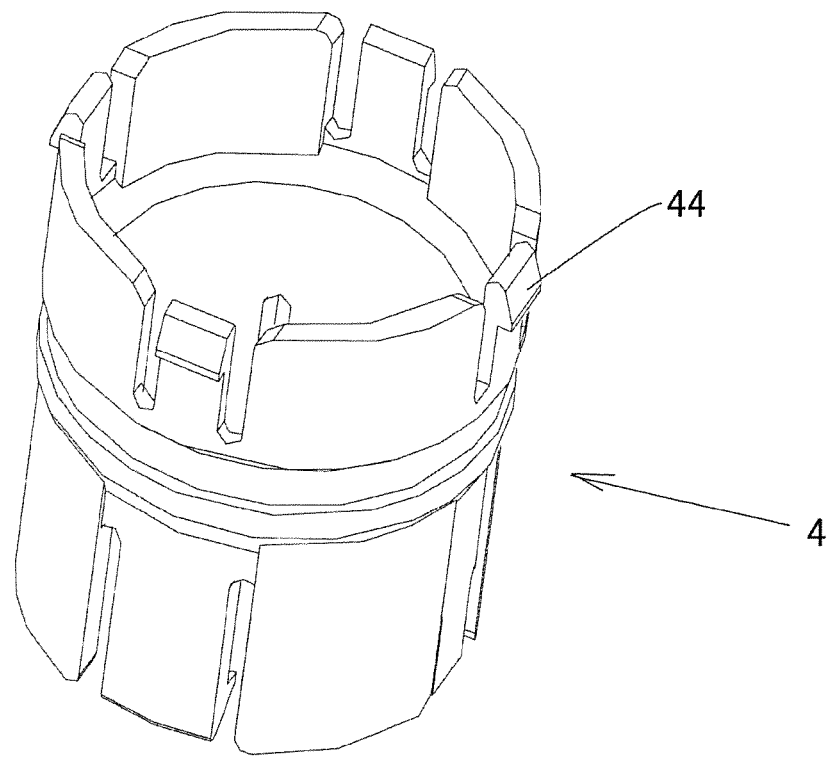
FIG. 12 is a perspective view of a mounting sleeve.
Figure 13:
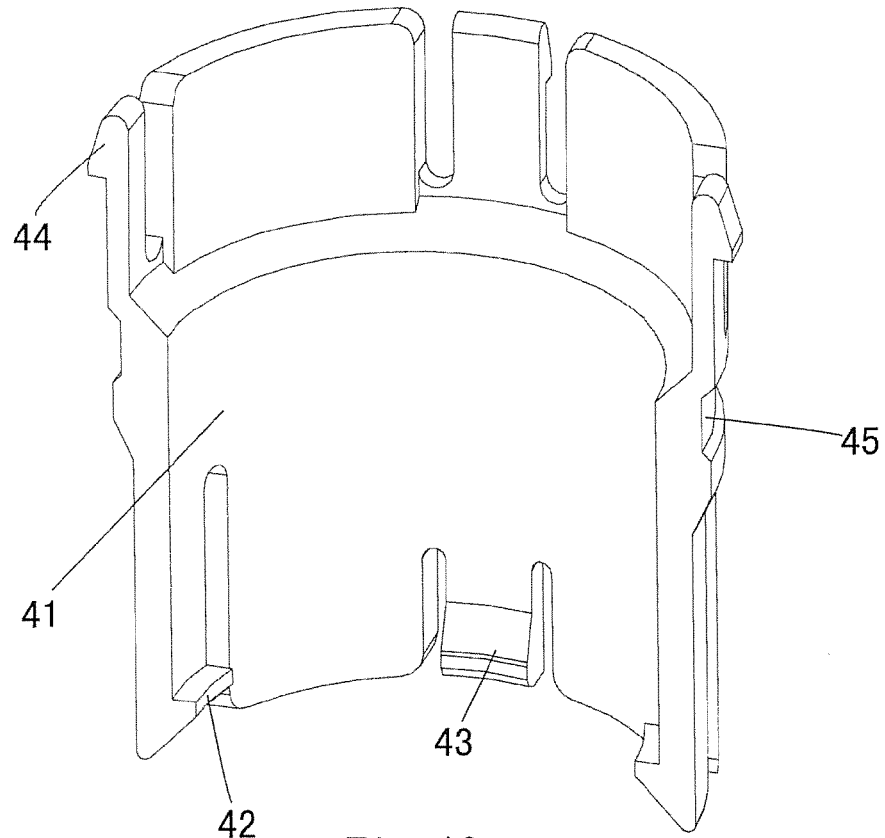
FIG. 13 is a cross section view of the mounting sleeve.

In the embodiments of FIGS. 1, 12 and 13, the mounting sleeve 4 has a substantially tube-like or sleeve-like structure, and is slidably mounted onto the support shaft 31. Furthermore, a plurality of protrusion receiving grooves extend in the axial direction, the grooves being formed in an inner surface of the mounting sleeve 4 or an outer surface of the support shaft 3. A plurality of complimentary slide protrusions are formed on the other of the inner surface of the mounting sleeve 4 and the outer surface of the support shaft 31. The slide protrusions are positioned in the protrusion receiving grooves when the mounting sleeve 4 is connected to the support shaft 31.

In an embodiment, the protrusion receiving grooves are formed in the outer surface of the support shaft 31, and the slide protrusions are formed in the inner surface of the mounting sleeve 4 adjacent to the first end (a lower end shown in FIG. 13). In this way, the mounting sleeve 4 can be displaced along the axial direction, with the slide protrusions being positioned in the respective protrusion receiving grooves of the support shaft 31. However, the mounting sleeve 4 is prevented from rotating around the axial direction relative to the support shaft 31, because of a blocking function of the slide protrusions. One of ordinary skill in the art would appreciate that the slide protrusions may be formed in the outer surface of the support shaft 31, and the protrusion receiving grooves may be formed in the inner surface of the mounting sleeve 4 adjacent to the first end.

In an embodiment of FIGS. 6, 8, 9, 12-13, and 15-16, the protrusion receiving grooves formed in the support shaft 31 include at least one first protrusion receiving groove 311 and at least one second protrusion receiving groove 316, and the slide protrusions formed on the inner surface of the mounting sleeve 4 include at least one first slide protrusion 42 and at least one second slide protrusion 43. During converting the reel 2 from the retraction state to the expansion state or from the expansion state to the retraction state, the first slide protrusion 42 and the second slide protrusion 43 slide in the first protrusion receiving groove 311 and the second protrusion receiving groove 316, respectively, and prevent the mounting sleeve 4 from being rotated relative to the support shaft 31. The first protrusion receiving groove 311 includes a first blocking projection 312 positioned adjacent to the free end (a tip end) of the support shaft 31, and the second protrusion receiving groove 316 includes a first limiting projection 313 positioned adjacent to the free end of the support shaft 31. In this way, when the reel 2 is displaced along the support shaft 31, from the retraction state to the expansion state in a expansion direction (an upward direction of FIGS. 15 and 16), the first blocking projection 312 contacts and latches to the first slide protrusion 42 (FIG. 15) to block the mounting sleeve 4 from being disengaged from the free end of the support shaft 31. Likewise, the first limiting projection 313 is contacts and latches to the second slide protrusion 43 (FIG. 16) to limit the mounting sleeve 4 from being displaced in a retraction direction (a downward direction of FIG. 16) opposite to the expansion direction.

Figure 15:
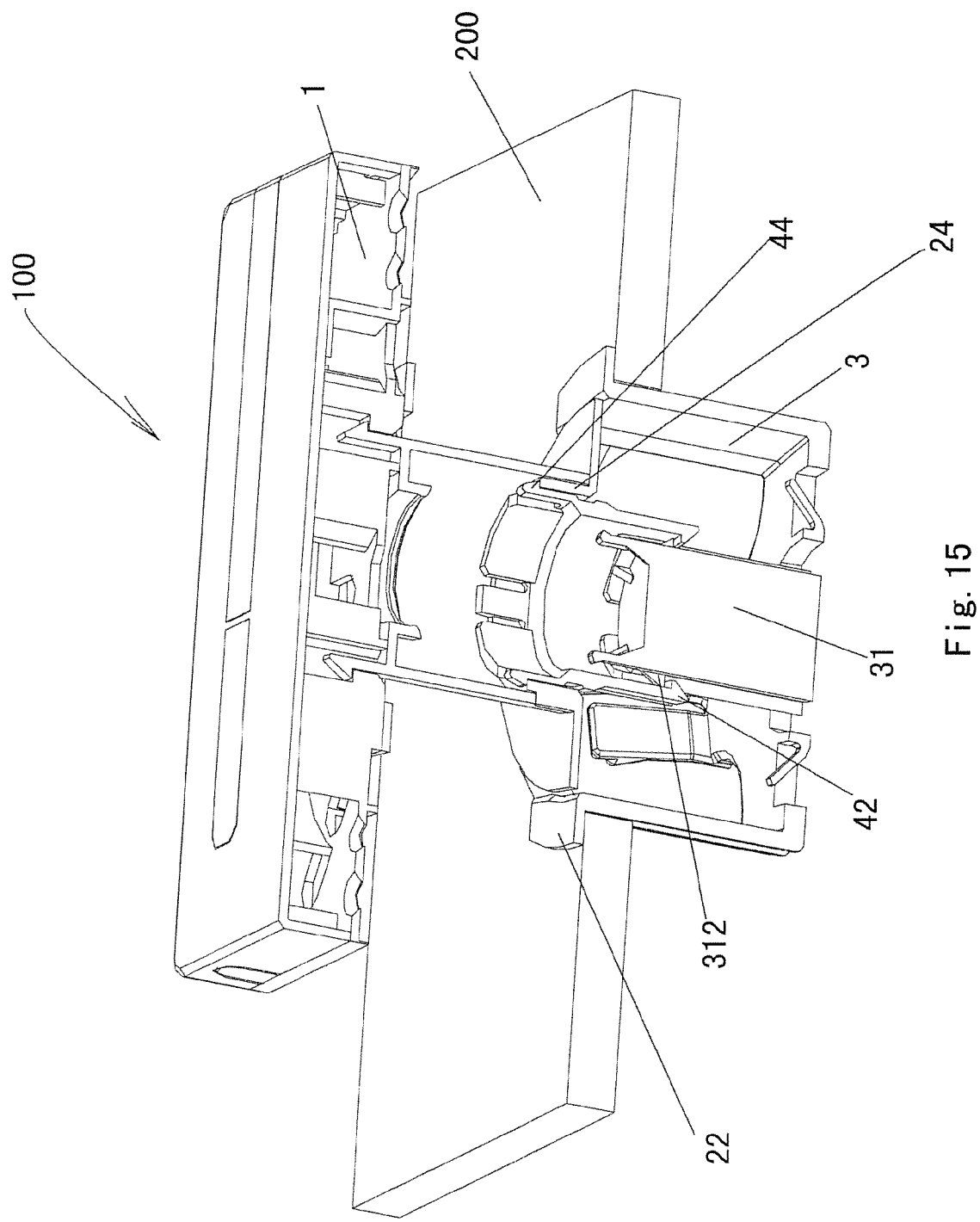
FIG. 15 is a cross section view of the fiber optic splicing assembly of FIG. 6 along a line B-B.

In the embodiments of FIGS. 13 and 15, the first blocking projection 312 and the first limiting projection 313 each has a matching surface extending substantially perpendicular to the axial direction. Therefore, once the first blocking projection 312 is complimentary to the first slide protrusion 42 and connected thereto by sliding the mounting sleeve 4. Once contact between the first slide protrusion 42 and the first blocking projection 312 is established, the mounting sleeve 4 cannot be further moved forward, regardless of whether a force is applied on it, unless contact between the first blocking projection 312 and the first slide protrusion 42 is broken. That is, the first blocking projection 312 is connected with the first slide protrusion 42 in a lock-fit manner.

Figure 16:
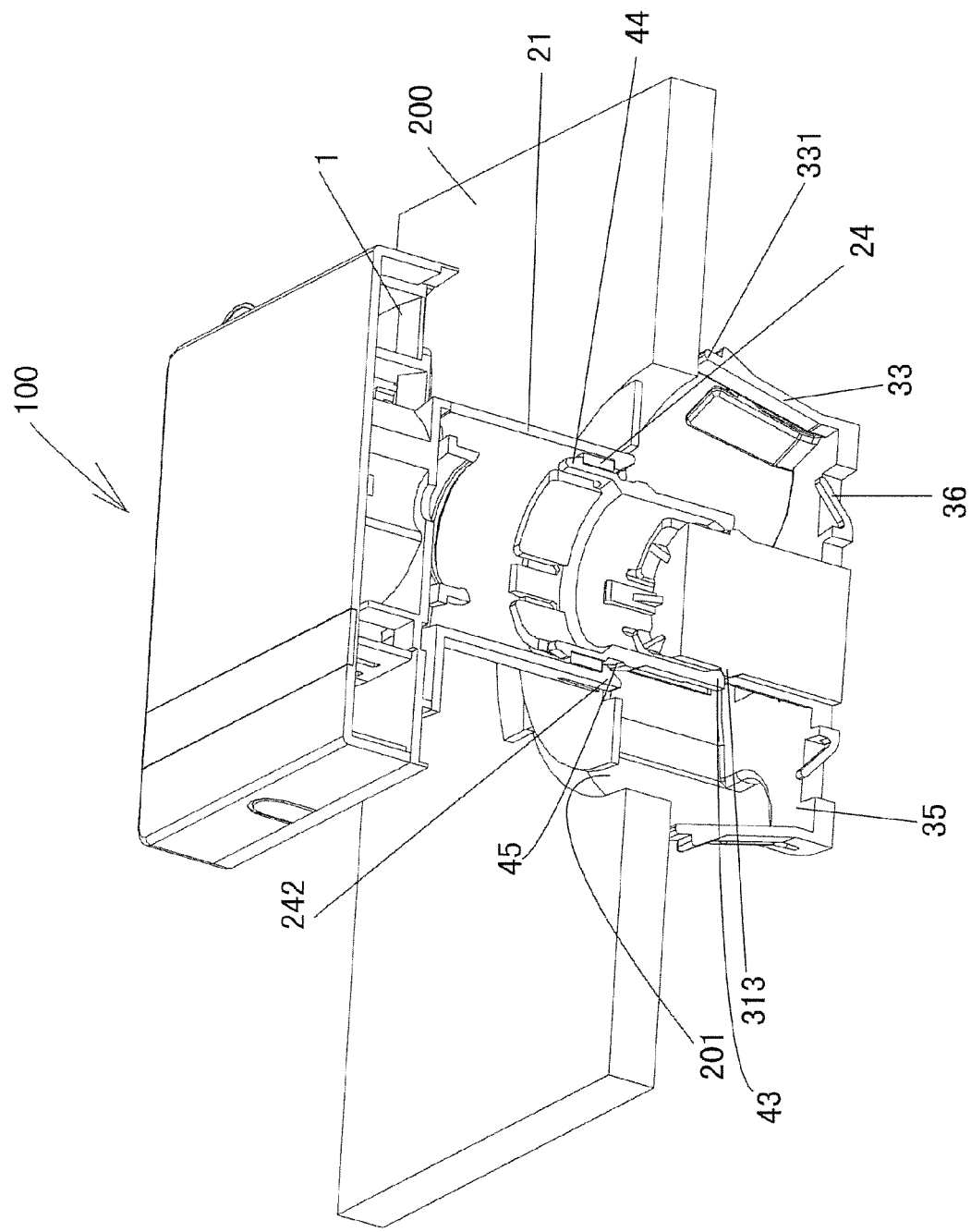
FIG. 16 is a cross section view of the fiber optic splicing assembly of FIG. 6 along a line C-C.
Figure 17:
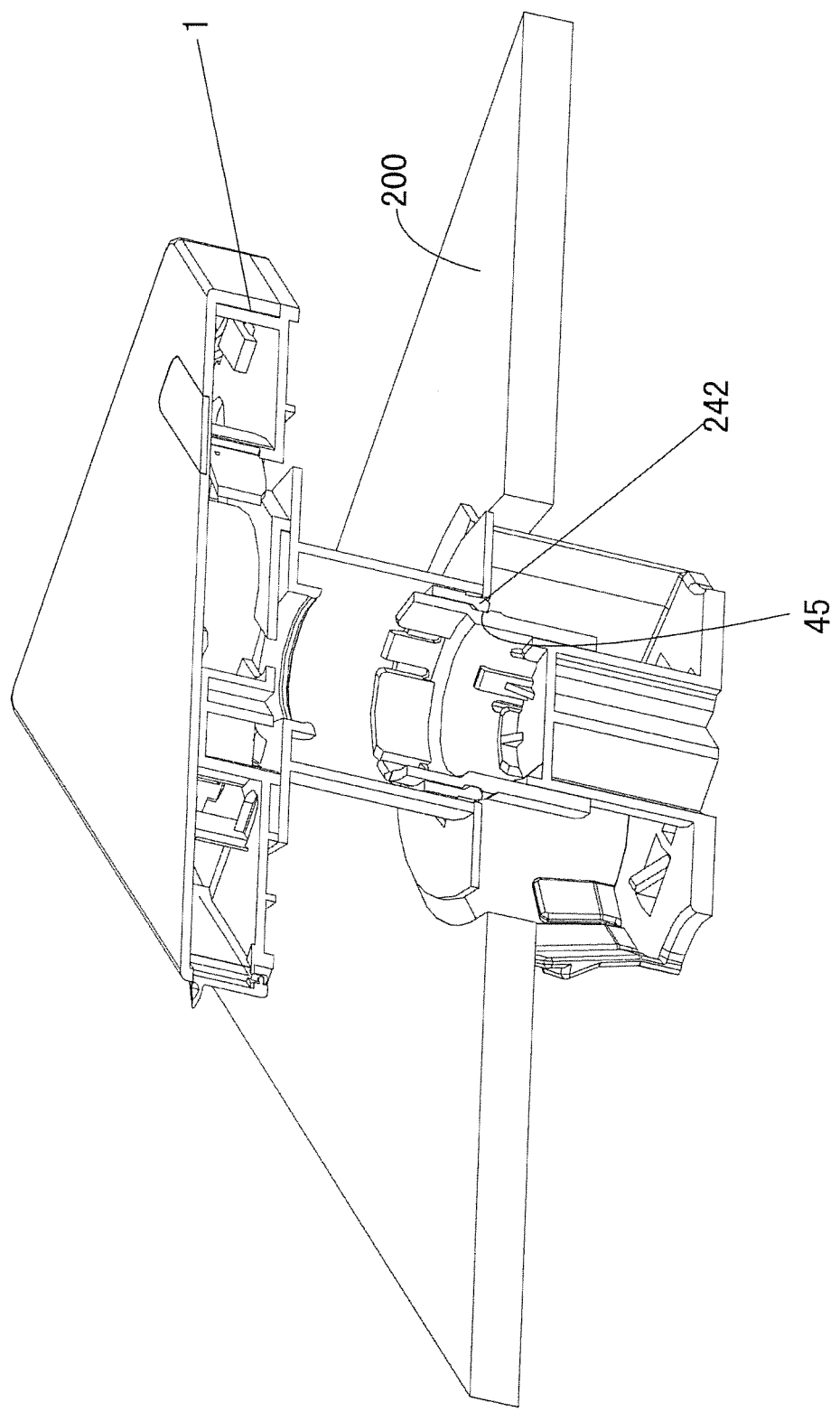
FIG. 17 is a cross section view of the fiber optic splicing assembly of FIG. 6 along a line D-D.

In the embodiments of FIGS. 13 and 16, the first limiting projection 313 and the second slide protrusion 43 each has a complimentary surface inclined to the axial direction. Therefore, when the mounting sleeve 4 is moved from the retraction state to the expansion state, a relative large force is exerted on the mounting sleeve 4 in the expansion direction, such that the second slide protrusion 43 can slide across the first limiting projection 313, due to a flexible deformation of the second slide protrusion 43, and to position the mounting sleeve 4 in the expansion state. Thereafter, when the force is removed, the first limiting projection 313 blocks the second slide protrusion 43 from being moved in the retraction direction (a downward direction of FIG. 16) opposite to the expansion direction. One of ordinary skill in the art would appreciate that the first limiting projection 313 can be released from the second slide protrusion 43 and that the mounting sleeve 4 can be moved in the retraction direction when a relative large force is exerted on the mounting sleeve 4 in the retraction direction. That is, the first limiting projection 313 is connected with the second slide protrusion 43 in a snap-fit manner.

In the above described embodiments the first and second slide protrusions 42, 43 include different protrusion receiving grooves. However, the invention not limited to this. One of ordinary skill in the art would appreciate that each of the protrusion receiving grooves may include a first blocking projection and a first limiting projection at a position adjacent to a free end of the support shaft. When the reel 2 is displaced from the retraction state to the expansion state along the expansion direction, the first blocking projection is locked with the slide protrusion to block the mounting sleeve from becoming disengaged from the free end, and the first limiting projection is snapped with the slide protrusion to limit the mounting sleeve from sliding in the retraction direction.

Figure 10:
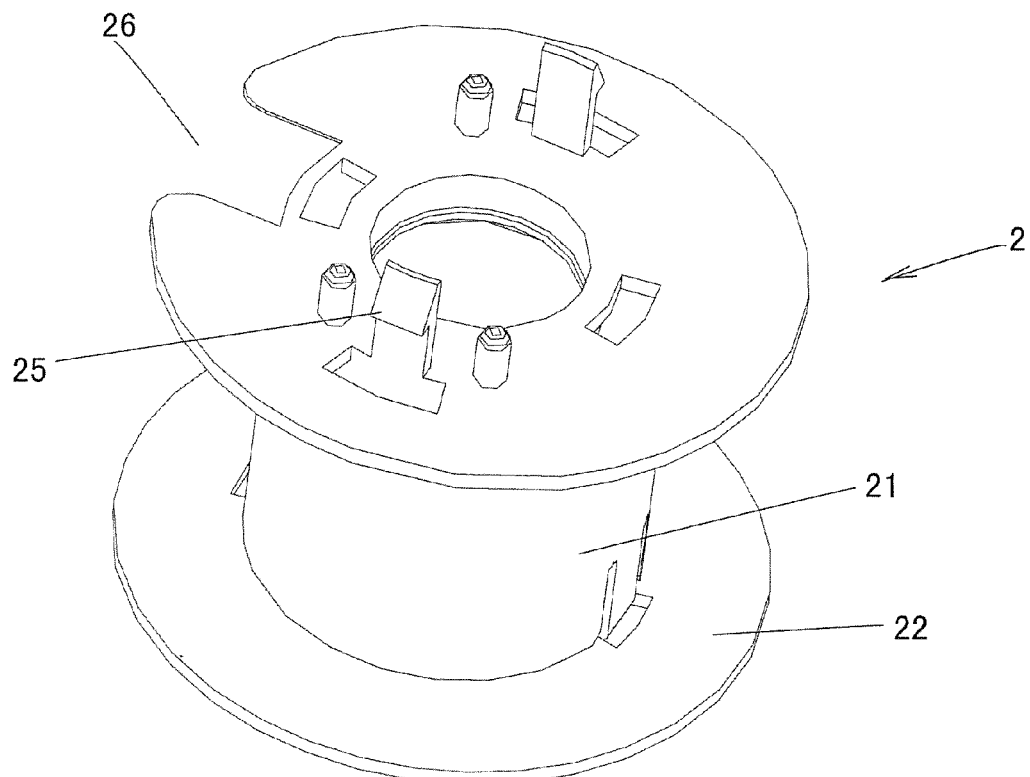
FIG. 10 is a perspective view of the reel.
Figure 11:
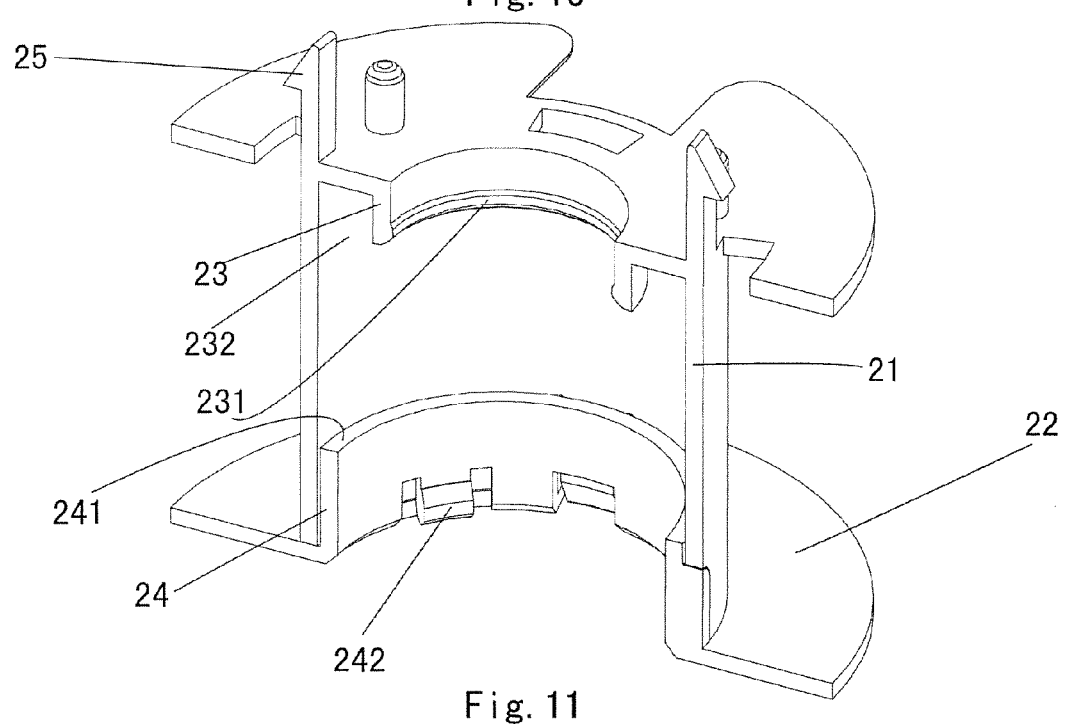
FIG. 11 is a cross section view of the reel.

In the embodiments of FIGS. 10 and 11, the reel 2 has a cylindrical body 21 and flanges 22 formed at opposite ends of the cylindrical body 21. A notch 26 is formed on the flange 22 positioned on a first end (an upper end of FIGS. 10 and 11) of the reel 2 for the optical cable or fiber to pass therethrough. The first end of the mounting sleeve 4 is positioned in a sleeve receiving passageway (not labeled) extending through the cylindrical body 21, with the mounting sleeve being axially movable.

In an embodiment of FIG. 11, the cylindrical body 21 has a ring-shaped protruding band 24 circumferentially positioned inside the sleeve receiving passageway on the second end (a lower end of FIGS. 10 and 11) of the cylindrical body 21. The protruding band 24 is rotatably positioned over the outer surface of the mounting sleeve 4, adjacent to the first end of the mounting sleeve 4.

Figure 14:
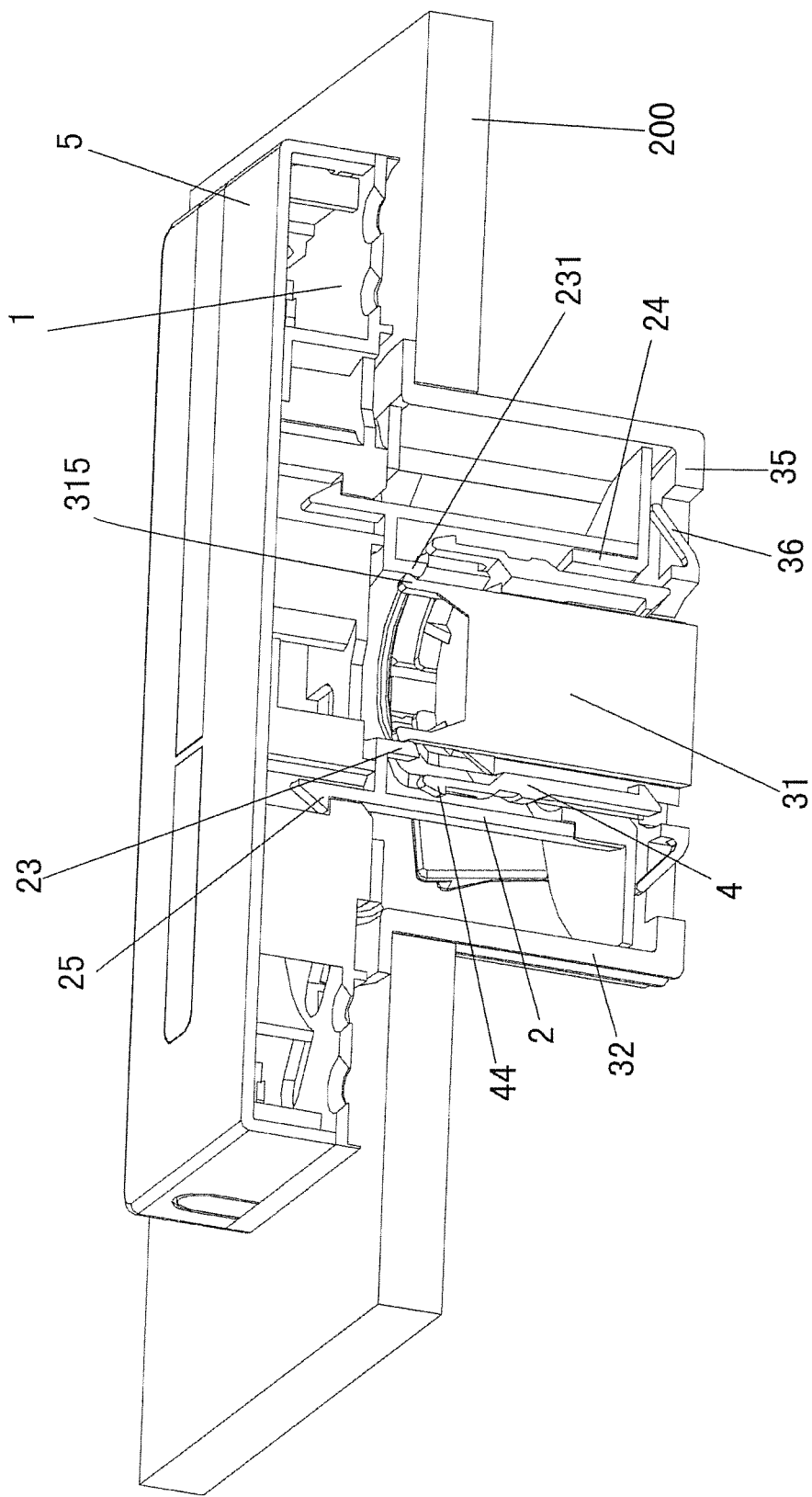
FIG. 14 is a cross section view of the fiber optic splicing assembly of FIG. 4 along a line A-A.

In the embodiments of FIGS. 10, 11, and 14, an engagement portion 25 is formed on the first end of the reel 2, extending outward from the flange 22, and engaging the assembly housing 1 in a snap-in manner.

A plurality of second blocking projections 44 are positioned on the first end of the mounting sleeve 4, and are configured to lock with a circumferential edge 241 of the protruding band 24 positioned proximate to the second end of the cylindrical body 21. The reel 2 is consequently blocked from disengaging from the first end of the mounting sleeve 4 when the reel 2 is in the expansion state. The second blocking projections 44 and the circumferential edge 241 each has a complimentary surface substantially perpendicular to the axial direction.

A plurality of second limiting projections 242 are positioned on the protruding band 24, and a circumferentially extending ring groove 45 is formed in the outer surface of the mounting sleeve 4. When the reel 2 is displaced from the retraction state to the expansion state in the expansion direction, the second limiting projection 242 is received in the ring groove 45 in a snap-fit manner so as to limit further displacement of the mounting sleeve 4 in the retraction direction.

In the embodiments of FIGS. 10, 11, and 14, a collar 23 is positioned in the second end of the cylindrical body 21, extending inward into the sleeve receiving passageway. The collar 21 is spaced a distance away from an inner wall of the cylindrical body 21 defining the sleeve receiving passageway to form a gap 232. When the reel 2 is in the retraction state, the collar 23 is positioned between the second end of the mounting sleeve 4 and the free end of the support shaft 31 (see FIG. 14), so that the reel 2 can be rotated relative to the support shaft 31 and the mounting sleeve 4.

A collar limiting projection 231 is formed on the collar 23, and a complementary third limiting projection 315 (See FIG. 9) is positioned on the free end of the support shaft 31. The collar limiting projection 231 engages with the third limiting projection 315 in a snap-fit manner so as to limit the reel 2 from being removed from the mounting sleeve 4 when the reel 2 is in the retraction state. In this way, the reel 2 can be stably received in the mounting bracket 3.

Figure 3:
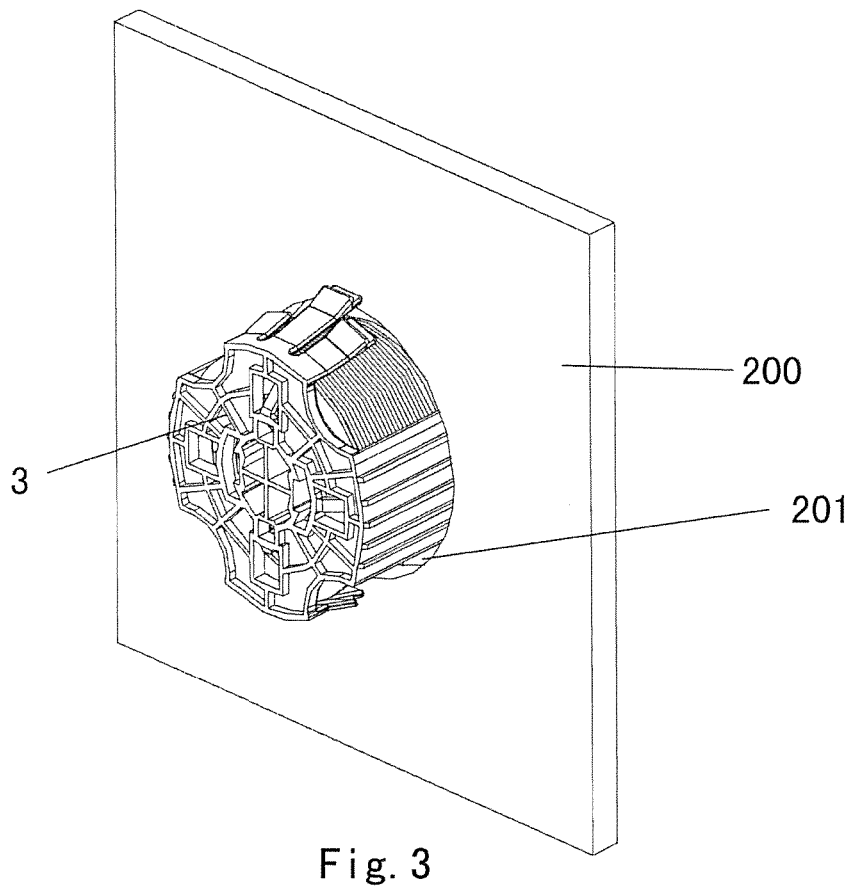
FIG. 3 is a perspective rear view of the fiber optic splicing assembly of FIG. 2.
Figure 7:
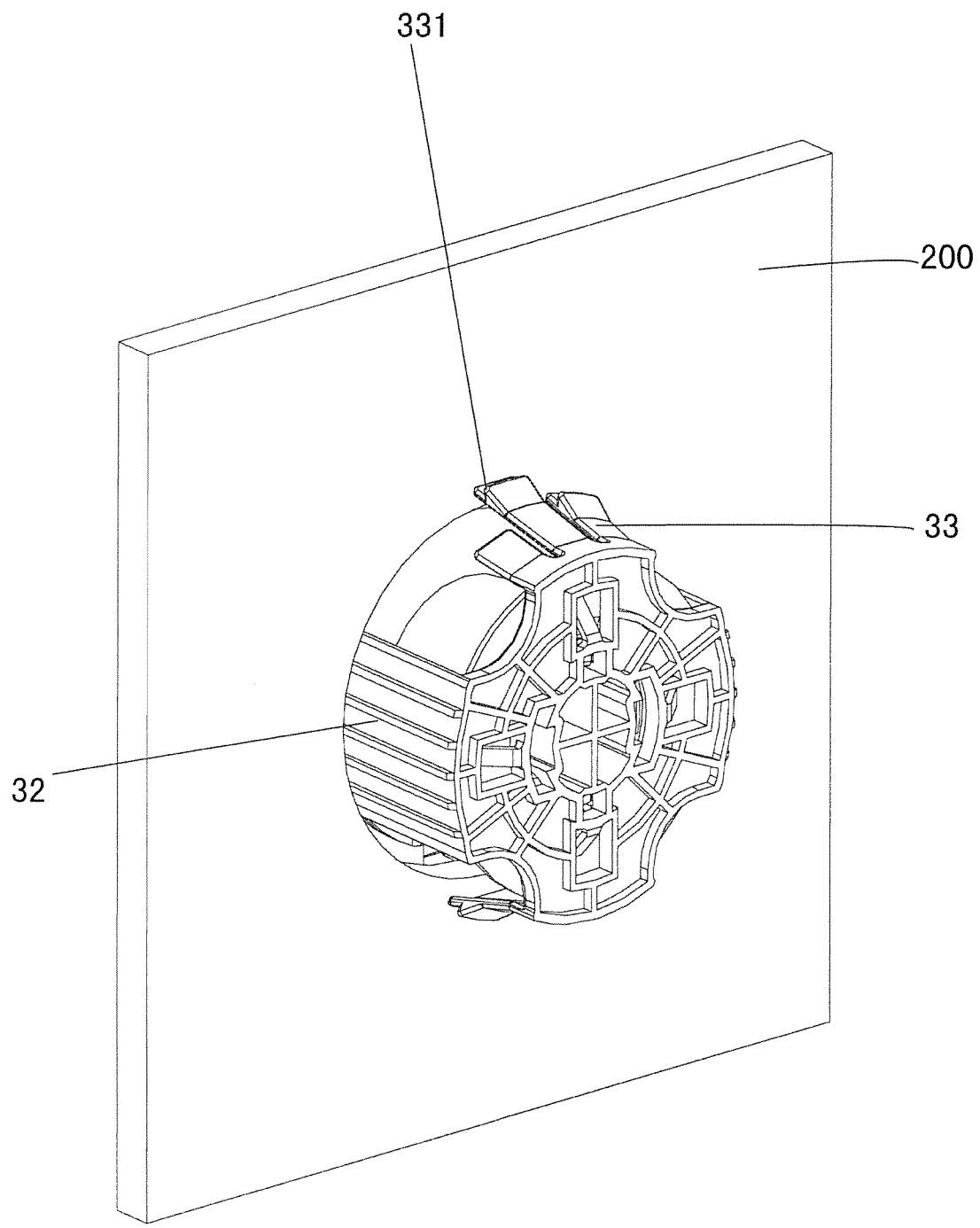
FIG. 7 is a perspective rear view of the fiber optic splicing assembly of FIG. 6.
Figure 8:
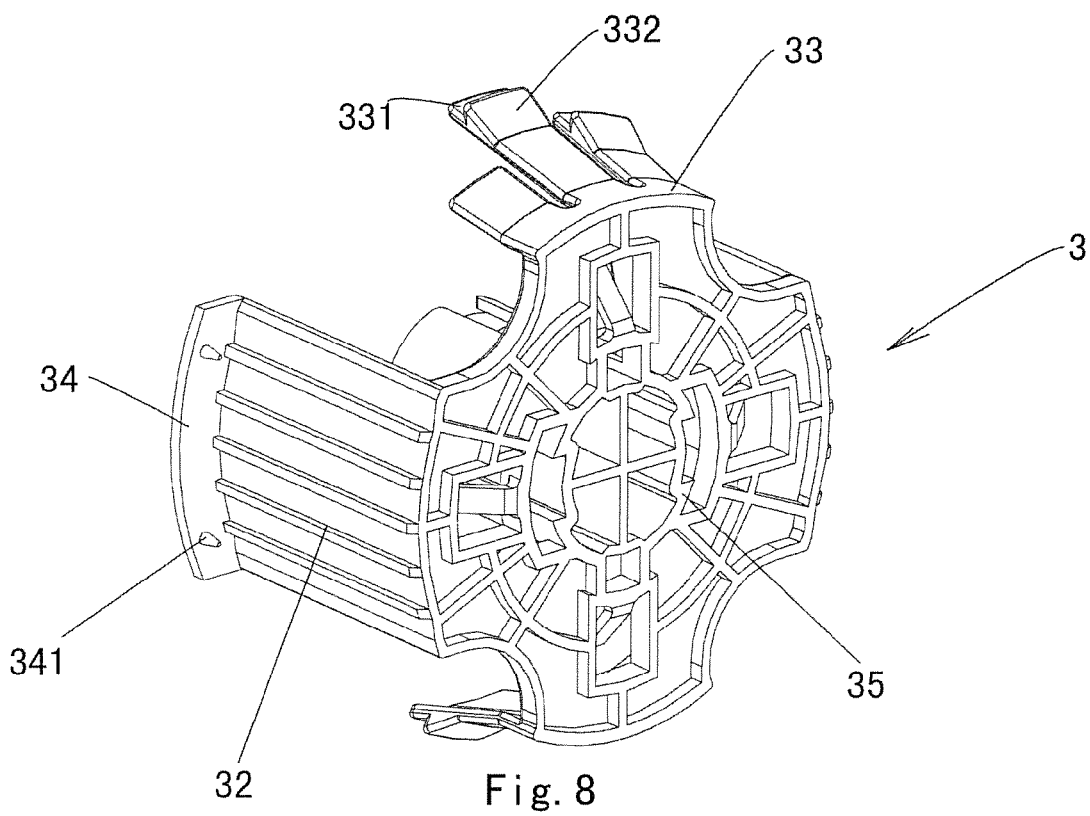
FIG. 8 is a perspective view of a mounting bracket of the fiber optic splicing assembly.
Figure 9:
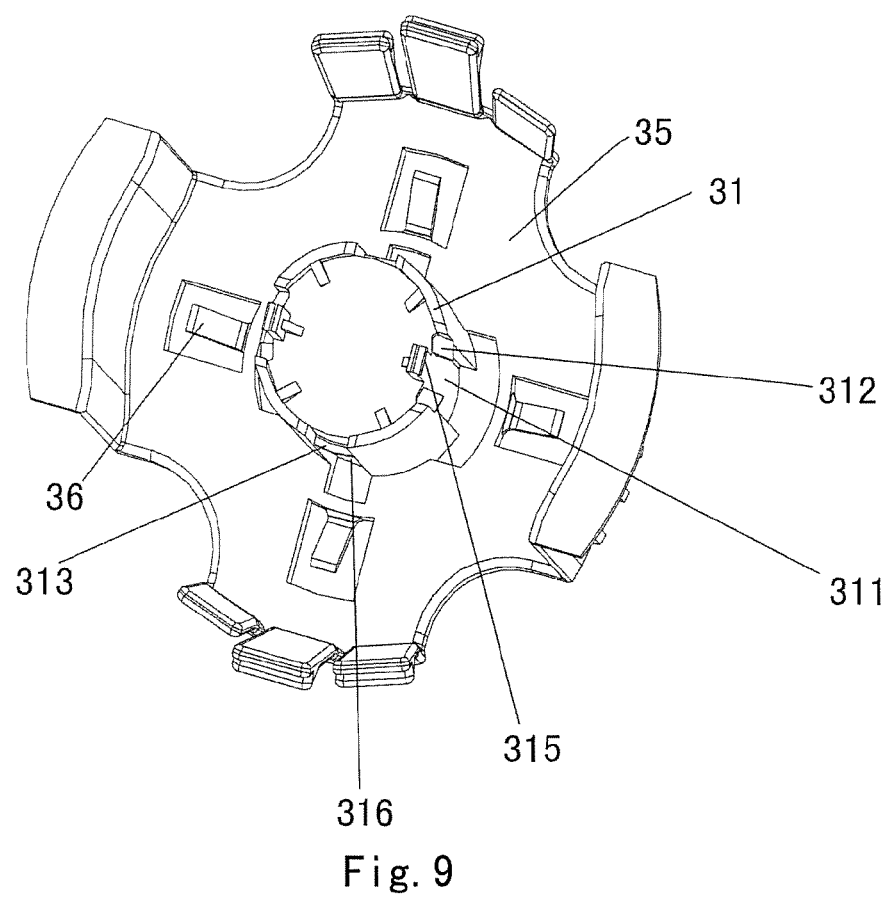
FIG. 9 is a perspective view of the mounting bracket of the fiber optic splicing assembly.

In the embodiments of FIGS. 8 and 9, the mounting bracket 3 has a bracket base 35 and a plurality of support arms 32. The support shaft 31 is supported on the bracket base 35. A plurality of support arms 32 extend from an edge of the bracket base 35. The mounting bracket 3 is connected to the mounting wall 200 through the support arms 32. A support arm flange 34 is positioned on a free end of the support arm 32, and engages the housing side of the mounting wall 200. The support arm flange 34 has a plurality of fixation pins 341 which are inserted into the mounting wall 200. The mounting bracket 3 also includes a plurality of groups of positioning portions 33 extending from an edge of the bracket base 35, with the positioning portions 33 and the support arms 32 being alternately positioned. Each group of positioning portions 33 includes a plurality of elastic positioning arms 331 having different lengths with respect to each other. Each positioning arm 331 is cantilevered, having a positioning projection 332 disposed on a free end thereof. In the embodiments of FIGS. 3 and 7, when the fiber optic splicing assembly 100 is positioned on the mounting wall 200, the fiber optic splicing assembly 100 extends through the assembly receiving passageway 201 from the housing side of the mounting wall 200 to the bracket side of the mounting wall 200, or the support arms 32 are slightly contracted inwardly to pass through the assembly receiving passageway 201 from the bracket side to the housing side of the mounting wall 200, and the support arm flange 34 is fixed onto the housing side of the mounting wall 20 with the fixation pin 341 of the support arm flange 34. Additionally, the positioning arms 331 abut against the bracket side of the mounting wall 200. If the mounting wall 200 has a relatively large thickness, the positioning arms 331 having a correspondingly larger length are inserted into the assembly receiving passageway 201, and the positioning projections 332 abut against the rear side of the mounting 200, such that the mounting bracket 3 can be reliably mounted on the mounting wall 200.

In another embodiment, the support arm 32 is elastic, and a circumference formed by the support arms 32 has an outer diameter larger than a diameter of the assembly receiving passageway 201. When the support arms 32 are mounted into the assembly receiving passageway 201, the support arms elastically deform and exert an elastic force against the assembly receiving passageway 201 to fix the support arms 32 in the assembly receiving passageway 201.

Figure 2:
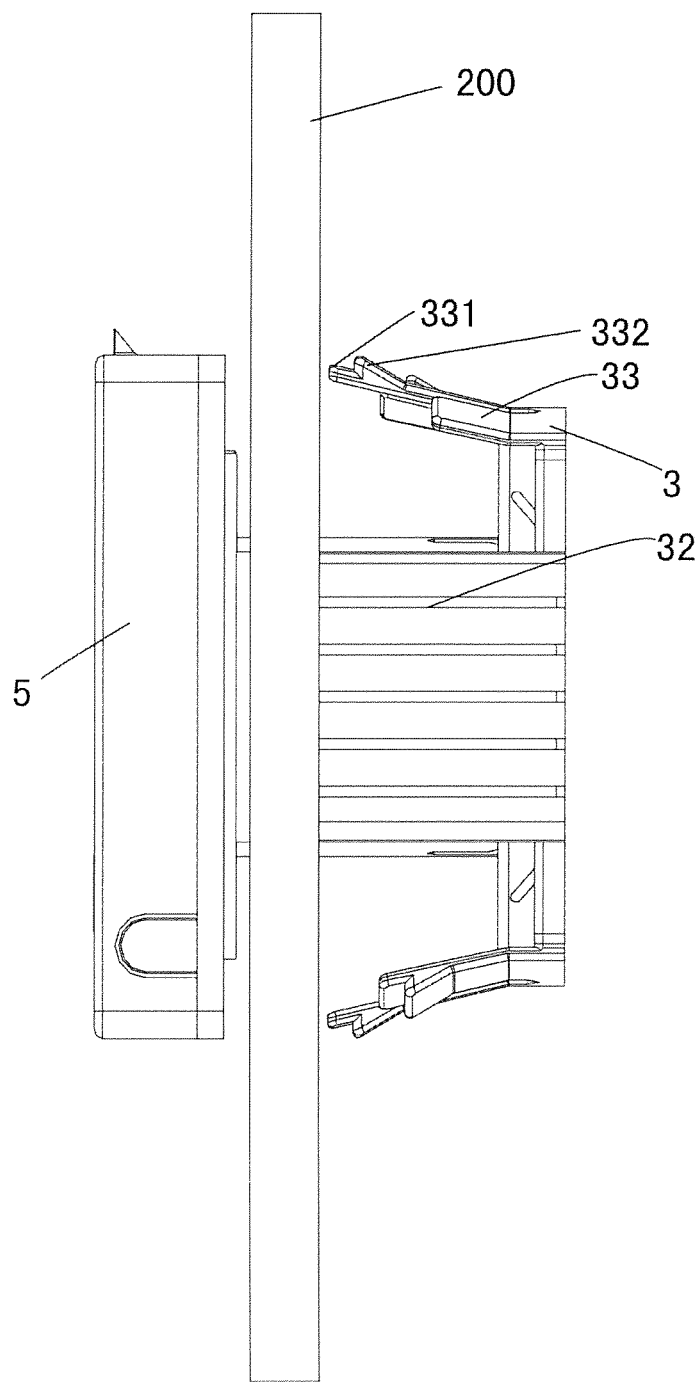
FIG. 2 is a side view of the fiber optic splicing assembly of FIG. 1, wherein the fiber optic splicing assembly is mounted to a mounting wall, and a reel thereof is in a retraction state.
Figure 4:
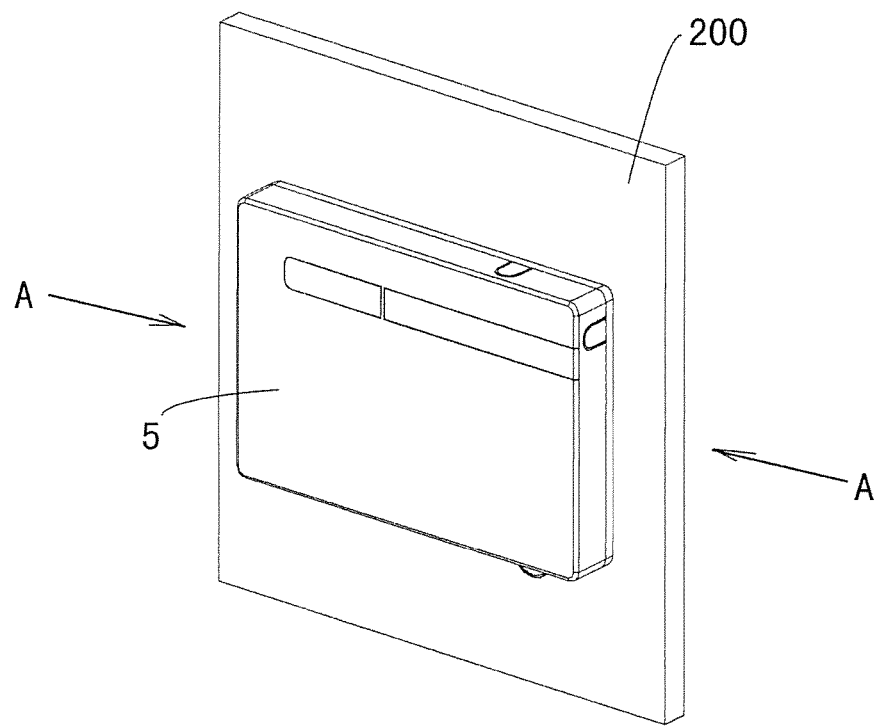
FIG. 4 is a perspective front view of the fiber optic splicing assembly of FIG. 2.

In the embodiments of FIGS. 9 and 14, the bracket base 35 has a plurality of elastic springs 36 protruding inwardly. As shown in FIGS. 2 and 5, two fastener receiving holes 14 are formed in the assembly housing 1. When the reel 2 is positioned on the mounting bracket 3 and prior to the assembly housing 1 being fixed to the mounting wall 200, the reel 2 is still rotatable relative to the support shaft 31. During rotation of the reel 2, the mounting side of the assembly housing 1 is separated from the housing side of the mounting wall 200 by a certain distance through the elastic springs 36. Accordingly, the surface of the mounting wall 200 is prevented from being scraped by the assembly housing 1 during rotating the assembly housing 1, while ensuring the stable rotation of the assembly housing 1. The assembly housing 1 includes at least two fastener receiving holes 14 for fixing the assembly housing 1 on the mounting wall 200 in cooperation with screws (not shown). After the assembly housing 1 is mounted on the mounting wall 200 through the fastener receiving holes 14, as shown in FIGS. 3-5, by screwing the screws, the elastic springs 36 are compressed, and the distance between the rear side of the assembly housing 1 and the front side of the mounting wall 200 can be eliminated, so that the assembly housing 1 is reliably mounted on the mounting wall 200.

Although the above embodiments describe that the mounting sleeve 4 is not rotatable relative to the support shaft 31 and that the reel 2 is rotatable relative to the mounting sleeve 4, the present invention is not limited to this. In another embodiment, a fiber optic splicing assembly has a mounting sleeve with a first end which is rotatably and axial-slideably connected to the support shaft, and an opposite second end which is axial-movably connected to the reel and not rotated with respect to the reel.

In another embodiment, the reel may be directly slidably connected to the support shaft. For example, a plurality of protrusion receiving grooves extending in the axial direction are formed in one of an inner surface of the reel and an outer surface of the support shaft, and a plurality of slide protrusions for being slidably fitted in respective protrusion receiving grooves are formed on the other of the inner surface of the reel and the outer surface of the support shaft.

In the fiber optic splicing assembly described in the above embodiments, the reel may be retracted to the bracket side of the mounting wall and expanded to the housing side of the mounting wall, facilitating the maintenance and management operation on the redundant optical cable and/or fiber. During mounting the assembly housing, the optical cable or fiber may be pre-stored in the reel. The optical cable or fiber may be unreeled out of the reel in use and spliced to other devices without calculating the length of the optical cable or fiber to be used, thereby achieving a quick splicing operation. The mounting bracket for receiving the reel may be mounted on various mounting walls, for example, plasterboards, with different thicknesses. Also, the reel is still rotatable in the mounting bracket under the retraction state where it is received in the mounting bracket. In addition, the reel is rotatable relative to the support shaft under the expansion state where it is expanded out of the mounting bracket to the housing side of the mounting wall, so that the optical cable or fiber can be unreeled from the reel. Furthermore, in the retraction state, the reel and the mounting bracket both are mounted on the bracket side of the mounting wall, and only the assembly housing having a thinner thickness is protruded outside the housing side of the mounting wall, saving the space and having a good appearance.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle, so that addition embodiments of fiber optic splicing assemblies can be achieved with overcoming the technical problem.

Although several exemplary embodiments have been shown and described, it would be appreciated by those of ordinary skill in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic splicing assembly comprising:
   an assembly housing having a mounting side and an opposite outer facing side; and
   a fiber storing device removably mounted to the assembly housing, and being at least partially received in an assembly receiving passageway of a mounting wall;
   the fiber storing device comprising a mounting bracket for attaching the fiber storing device to the mounting wall and a reel for pre-storing an optical cable and/or fiber, the reel being mounted on the mounting bracket;
   wherein the mounting bracket comprises a support shaft, and the reel is movably mounted onto the support shaft such that the reel is axially movable relative to the support shaft from a retraction state, where the reel is positioned in the assembly receiving passageway, to an expansion state, where the reel is positioned outside the assembly receiving passageway;
   the fiber storing device further comprising a mounting sleeve having a first end connected to the reel in a manner of being axially movable, and a second end connected to the support shaft in a manner of being axially movable; and
   wherein the reel is rotatable relative to the mounting sleeve, the reel being rotatable in both the expansion state and the retraction state.

2. The fiber optic splicing assembly according to claim 1, wherein the reel is rotatably positioned onto the support shaft.

3. The fiber optic splicing assembly according to claim 1, wherein the reel is rotatably connected to the first end of the mounting sleeve.

4. The fiber optic splicing assembly according to claim 3, wherein the mounting sleeve is slidably connected to the support shaft, having a complimentary shape so as to prevent the mounting sleeve from rotating relative to the support shaft.

5. The fiber optic splicing assembly according to claim 3, wherein the mounting sleeve has a substantially tube-like or sleeve-like structure and is slidably mounted onto the support shaft.

6. The fiber optic splicing assembly according to claim 5, wherein a plurality of protrusion receiving grooves extend in an axial direction on either an inner surface of the mounting sleeve or outer surface of the support shaft; and
   a plurality of complimentary slide protrusions are formed on the other of the inner surface of the mounting sleeve or the outer surface of the support shaft, and being positioned in the respective protrusion receiving grooves.

7. The fiber optic splicing assembly according to claim 6, wherein the protrusion receiving grooves are formed in the outer surface of the support shaft, and the slide protrusions are formed in the inner surface of the mounting sleeve adjacent to the first end.

8. The fiber optic splicing assembly according to claim 7, wherein the protrusion receiving groove includes
a first blocking projection, and
a first limiting projection positioned adjacent to a free end of the support shaft; with the first blocking projection being locked with the slide protrusion to block the mounting sleeve from being disengaged from the free end when the reel is transitioned from a retraction state to an expansion state along a expansion direction, and the first limiting projection being snapped with the slide protrusion to limit the mounting sleeve from sliding in a retraction direction opposite to the expansion direction.

9. The fiber optic splicing assembly according to claim 7, wherein
the protrusion receiving grooves have
at least one first protrusion receiving groove having a first blocking projection at a position adjacent to a free end of the support shaft, and
at least one second protrusion receiving groove having a first limiting projection at a position adjacent to the free end of the support shaft;
the slide protrusions have
at least one first slide protrusion, and
at least one second slide protrusion; and
the first blocking projection being locked with the first slide protrusion to block the mounting sleeve from being disengaged from the free end, and the first limiting projection being snap-fitted with the second slide protrusion to limit the mounting sleeve from sliding in an retraction direction, when the reel is converted from the retraction state to the expansion state in an opposite expansion direction.

10. The fiber optic splicing assembly according to claim 3, wherein the first end of the mounting sleeve is positioned into a cylindrical body of the reel, and being axially movable with respect to the reel.

11. The fiber optic splicing assembly according to claim 10, wherein the cylindrical body is has a protruding band circumferentially positioned inside a second end thereof, and being rotatably positioned over the outer surface of the mounting sleeve adjacent to the first end of the mounting sleeve.

12. The fiber optic splicing assembly according to claim 11, wherein a plurality of second blocking projections are positioned on the first end of the mounting sleeve, and locking with a circumferential edge of the protruding band positioned proximate to the second end of the cylindrical body, blocking the reel from being disengaged from the first end of the mounting sleeve when the reel is converted from the retraction state to the expansion state.

13. The fiber optic splicing assembly according to claim 12, wherein a plurality of second limiting projections are positioned on the protruding band, and a circumferentially extending ring groove is formed in the outer surface of the mounting sleeve, with the second limiting projection being snap-fitted to the ring groove, limiting further displacement of the mounting sleeve in the retraction direction when the reel is converted from the retraction state to the expansion state in the expansion direction.

14. The fiber optic splicing assembly according to claim 12, wherein a collar is positioned in a second end of the cylindrical body extending inward, and being spaced a distance away from an inner wall of the cylindrical body to form a gap therebetween, with the reel being rotatable relative to the support shaft and the mounting sleeve when the reel is in the retraction state.

15. The fiber optic splicing assembly according to claim 14, wherein a collar limiting projection is formed on the collar, and a complimentary third limiting projection is positioned on the free end of the support shaft, with the collar limiting projection being snap-fitted with the third limiting projection when the reel is in the retraction state, limiting the reel from being removed from the mounting sleeve.

16. The fiber optic splicing assembly according to claim 1, wherein the mounting bracket has
a bracket base on which the support shaft is positioned; and
a plurality of support arms extending from an edge of the bracket base, and connecting the mounting bracket to the mounting wall.

17. The fiber optic splicing assembly according to claim 16, wherein the support arm has a support arm flange positioned on a free end, and engaging a housing side of the mounting wall.

18. The fiber optic splicing assembly according to claim 17, wherein the support arm flange a fixation pin inserted into the mounting wall.

19. The fiber optic splicing assembly according to claim 18, wherein the mounting bracket further includes a plurality of groups of positioning portions extending from an edge of the support arms, with the positioning portions and the support arms being alternately positioned.

20. The fiber optic splicing assembly according to claim 19, wherein each group of positioning portions has a plurality of positioning arms having different lengths with respect to each other.

21. The fiber optic splicing assembly according to claim 20, wherein the positioning arm has a positioning projection.

22. The fiber optic splicing assembly according to claim 16, wherein each support arm is cantilevered, and a circumference formed by the support arms has an outer diameter larger than a diameter of the assembly receiving passageway; and when the support arms are mounted into the assembly receiving passageway, the support arms are elastically deformed and exert an elastic force against the assembly receiving passageway to fix the support arms in the assembly receiving passageway.

23. The fiber optic splicing assembly according to claim 16, wherein the bracket base has a plurality of elastic springs protruding inward.

24. The fiber optic splicing assembly according to claim 1, wherein
a plurality of protrusion receiving grooves extending in an axial direction are formed in either an inner surface of the reel or an outer surface of the support shaft; and
a plurality of slide protrusions are formed in the other inner surface of the reel or the outer surface of the support shaft, and being slidably fitted in the respective protrusion receiving grooves.

25. The fiber optic splicing assembly according to claim 1, wherein
a plurality of protrusion receiving grooves extending in an axial direction are formed in either the outer surface of the reel or the inner surface of the support shaft; and
a plurality of slide protrusions are formed on the other of the outer surface of the reel or the inner surface of the support shaft, and being slidably fitted in the respective protrusion receiving grooves.

26. The fiber optic splicing assembly according to claim 1, wherein the mounting bracket is further formed with an engagement portion fixed to the assembly housing in a snap-fit manner.

27. The fiber optic splicing assembly according to claim 1, wherein the assembly housing includes at least two fastener receiving holes for fixing the assembly housing on the mounting wall using a fastener positioned therein.

28. A fiber optic splicing assembly mountable to a mounting wall with a mounting hole, comprising:
- a splicing panel of which a front side is configured to mount a fiber optic splicing device for splicing fibers;
- a fiber storing device configured to be at least partially received in the mounting hole;
- wherein one end of the fiber storing device is removably mounted to the splicing panel;
- the fiber storing device comprising a mounting bracket for attaching the fiber storing device to the mounting wall and a reel for pre-storing an optical cable and/or fiber, the reel being mounted on the mounting bracket;
- wherein the mounting bracket has a bracket base on which the support shaft is positioned;
- and a plurality of support arms extending from an edge of the bracket base, and connecting the mounting bracket to the mounting wall.

29. A fiber optic splicing assembly mountable to a mounting wall, comprising:
- a splicing panel of which a front side is configured to mount a fiber optic splicing device for splicing fibers;
- a fiber storing device, one end of the fiber storing device being removably mounted to the splicing panel, the fiber storing device comprising:
  - a bracket mounted to the mounting wall;
  - a reel for pre-storing an optical cable and/or fiber, the reel being mounted on the bracket; and
  - an intermediate shaft having a first end connected to the reel in a manner of being axially movable, and a second end;
- the bracket comprising:
  - a support shaft, and the reel is movably sleeved onto the support shaft so that the reel is axially movable from a retraction state to an expansion state;
- the second end of the intermediate shaft being connected to the support shaft in a manner of being axially movable;
- wherein the reel is rotatable relative to the intermediate shaft, the reel being rotatable in both the expansion state and the retraction state;
- wherein a plurality of protrusion receiving grooves extend in an axial direction on an outer surface of the support shaft; and a plurality of complimentary slide protrusions are formed in the inner surface of the intermediate shaft, and being positioned in the respective protrusion receiving grooves; and
- wherein the protrusion receiving groove comprises:
  - a first blocking projection; and
  - a first limiting projection positioned adjacent to a free end of the support shaft; with the first blocking projection being locked with the slide protrusion to block the intermediate shaft from being disengaged from the free end when the reel is transitioned from the retraction state to the expansion state along a expansion direction, and the first limiting projection being snapped with the slide protrusion to limit the intermediate shaft from sliding in a retraction direction opposite to the expansion direction.

30. The fiber optic splicing assembly according to claim 29, wherein the first end of the intermediate shaft is positioned into a cylindrical body of the reel.

31. The fiber optic splicing assembly according to claim 30, wherein the cylindrical body of the reel has a protruding band circumferentially positioned inside a second end thereof, and being rotatably positioned over the intermediate shaft adjacent to the first end of the intermediate shaft.

32. The fiber optic splicing assembly according to claim 31, wherein a plurality of second limiting projections are positioned on the protruding band, and a circumferentially extending ring groove is formed in an outer surface of the intermediate shaft, with the second limiting projections being snap-fitted to the ring groove, limiting further displacement of the intermediate shaft in the retraction direction when the reel is converted from the retraction state to the expansion state in the expansion direction.

33. The fiber optic splicing assembly according to claim 30, wherein a ring skirt portion is positioned in a second end of the cylindrical body extending inward, and being spaced a distance away from an inner wall of the cylindrical body to form a gap therebetween, with the reel being rotatable relative to the support shaft and the intermediate shaft when the reel is in the retraction state.

* * * * *